(12) United States Patent
Li

(10) Patent No.: US 10,386,952 B2
(45) Date of Patent: Aug. 20, 2019

(54) FORCE SENSING TOUCH SYSTEM INCLUDING A STRAIN AMPLIFYING STRUCTURE AND COMPUTING DEVICE WITH A FORCE SENSING TOUCH SYSTEM

(71) Applicant: SHENZHEN NEW DEGREE TECHNOLOGY CO., LTD., Shenzhen, Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/579,634

(22) PCT Filed: Jul. 9, 2015

(86) PCT No.: PCT/CN2015/083681
§ 371 (c)(1),
(2) Date: Dec. 5, 2017

(87) PCT Pub. No.: WO2017/004832
PCT Pub. Date: Jan. 12, 2017

(65) Prior Publication Data
US 2018/0164940 A1  Jun. 14, 2018

(51) Int. Cl.
*G06F 3/041* (2006.01)
(52) U.S. Cl.
CPC .. *G06F 3/0414* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 4,550,384 A | 10/1985 | Kimura | |
| 5,541,372 A * | 7/1996 | Baller | G06F 3/0414 178/18.01 |
| 5,915,285 A * | 6/1999 | Sommer | G01L 1/2287 338/2 |
| 6,131,512 A * | 10/2000 | Verlinden | B41N 1/08 101/368 |
| 7,196,694 B2 | 3/2007 | Roberts | |
| 7,746,325 B2 | 6/2010 | Roberts | |
| 8,625,882 B2 | 1/2014 | Backlund et al. | |

(Continued)

FOREIGN PATENT DOCUMENTS

| | | |
|---|---|---|
| CN | 1794336 | 6/2006 |
| CN | 102053750 | 5/2011 |

(Continued)

OTHER PUBLICATIONS

International Search Report of the ISA for PCT/CN2015/083681, dated Feb. 29, 2016, 3 pages.

*Primary Examiner* — Gene W Lee
*Assistant Examiner* — Kirk W Hermann
(74) *Attorney, Agent, or Firm* — Nixon & Vanderhye PC

(57) ABSTRACT

A computing device configured to take action based on user touch position and force comprises a touch system and a strain amplifying force sensing structure attached to an underside of the touch system. The strain amplifying force sensing structure comprises a force sensing layer and a support plate with a strain amplifying structure.

19 Claims, 3 Drawing Sheets

(56) References Cited

U.S. PATENT DOCUMENTS

| | | |
|---|---|---|
| 2007/0052690 A1 | 3/2007 | Roberts |
| 2008/0283310 A1 | 11/2008 | Moore |
| 2010/0053087 A1* | 3/2010 | Dai .................. G06F 3/016 345/168 |
| 2010/0057235 A1* | 3/2010 | Wang ................ G06F 1/1626 700/94 |
| 2010/0123686 A1 | 5/2010 | Klinghult et al. |
| 2011/0032127 A1* | 2/2011 | Roush ................ H01H 13/785 341/34 |
| 2012/0105358 A1 | 5/2012 | Momeyer et al. |
| 2013/0274587 A1* | 10/2013 | Coza .................. A61B 5/6804 600/409 |
| 2013/0342501 A1 | 12/2013 | Mölne et al. |
| 2014/0028575 A1 | 1/2014 | Parivar et al. |
| 2014/0216174 A1 | 8/2014 | Aberg et al. |
| 2014/0253305 A1 | 9/2014 | Rosenberg et al. |
| 2015/0296622 A1* | 10/2015 | Jiang .................. G01L 1/2268 361/750 |
| 2016/0054185 A1* | 2/2016 | Servati ................ G01L 1/2287 73/774 |
| 2016/0188039 A1* | 6/2016 | Yoon .................. G06F 3/044 345/174 |

FOREIGN PATENT DOCUMENTS

| | | | |
|---|---|---|---|
| CN | 102339179 | 2/2012 | |
| CN | 102804116 | 11/2012 | |
| CN | 103076930 | 5/2013 | |
| CN | 104423740 | 3/2015 | |
| EP | 2 685 358 | 1/2014 | |
| EP | 2685358 A1 * | 1/2014 | ........... G06F 3/0414 |

\* cited by examiner

FORCE SENSING TOUCH SYSTEM INCLUDING A STRAIN AMPLIFYING STRUCTURE AND COMPUTING DEVICE WITH A FORCE SENSING TOUCH SYSTEM

This application is the U.S. national phase of International Application No. PCT/CN2015/083681 filed Jul. 9, 2015, which designated the U.S., the entire contents of which is hereby incorporated by reference.

TECHNICAL FIELD

The present invention relates to a touch system, and more specifically to a computing device recognizing force applied by a user to a force sensing touch system and the computing device using the user input to take action.

BACKGROUND ART

Computing devices such as smartphones, tablets, e-readers, smart watches, virtual keyboards, machine panels and the like, can include a touch system in communication with a control unit configured to recognize the touch signal from the touch system and the control unit can take contextual action based on its programming. Touch systems can sense a user touch that can be from one or more fingers or styluses. A user touch becomes a touch input when the touch is recognized by a computing device and may be used to take action. An action received by the user is a touch output. Touch systems such as touch screens, touch pads and touch controls and the like are well known in the art for manipulating computing devices such as portable and desktop devices, gaming systems, and industrial machines. Touch screens can have a touch sensing panel which is transparent, include a touch sensing system arranged over a display and can sense a user touch. Displayed information can not only be read by the user but the user may even interact with it by touching the touch screen on specific locations to initiate an action. Touch pads can have a touch sensing panel that may or may not be transparent and can sense a user touch. User touch over the touch pad area may become a location specific action on an associated but separate display. Touch controls may have a touch sensing panel with discrete arrangements of touch buttons or touch input keys or sliders. Touch controls maintain the aesthetics and integrity of the panel's material and design and can still provide the necessary buttons for user input. Touch systems includes a touch sensing panel, may include a protective cover layer, support frames and substrates, and may or may not include one or more displays, other buttons and the like.

Touch sensing panels can be formed by projected capacitive sensing, commonly referred to as capacitive touch. Here an array of conductive metal lines is orthogonally arranged and separated by an insulating layer creating a capacitive pixel at the cross points. An electrically activated capacitive array can then detect a user touch and its location, specifically the user touch interferes and attenuates the array's electrical signal pattern over a few pixels. Projected capacitive sensing requires the user to touch by finger or special conductive stylus because the signal attenuating interference needed to recognize a user touch is based on an electrical signal being diverted by creating a temporary conducting path to ground through the user. The user touch is recognized by the computing device; specifically the touch sensing panel communicates the user touch to the control unit where the programming determines the necessary context based action. Capacitive touch is a two-dimensional touch system that recognizes the surface location of user touch; specifically the x-y coordinates of touch. Touch sensing panels may be capable of more than a single user input. They may be capable of multi-touch and gesture touch. In single user touch only one touch point on the touch sensing panel is recognized at any given instance as compared to multi-touch where more than one touch may be simultaneously be recognized by the touch system. Multi-touch may be used to develop touch patterns or gestures, for example two fingers being moved apart may be a zoom-in gesture or two fingers being brought together may be a zoom-out gesture.

Force sensing touch systems that are capable of force sensing add new capabilities to user input. Not only can the touch system know the touch location, it can also become aware of how hard the user is pushing. The additional degree of freedom can create more innovative interactions with touch systems and make them more intuitive to the user. One handed operations are more easily implemented, for example moving the web page up or down can be dynamically adjusted based on the applied force or music volume can be turned up or down quickly based on applied force. User applied force leads to mechanical changes or strain detected by the force sensing touch system and converted into an electrical signal for the computer system to recognize and act upon. Force sensing touch systems require integrating force sensors with touch sensing panels and incorporating signals from force sensors into the related computing device organization and operations. Special care must be taken to account for space and mechanical behavior of the physical design of the product to ensure that the user applied force and its associated strain is optimally detected by the force sensors. True force sensing touch systems may not be formed by using projected capacitive touch. Force sensing touch systems may use discrete mechanical springs, force sensing resistors (FSR), force sensing capacitors (FSC), strain gauges (SG), or piezoresistive sensors. Discrete mechanical springs and discrete strain gauges are generally large in size on the order of few millimeters or more, require tens of microns of deflection for activating the force sensors and have low sensitivity. Force sensing resistors and force sensing capacitors are very sensitive to preloading mechanical stresses introduced during the product assembly in manufacturing and can lead to yield losses, sensor variability, and reduced dynamic operating range. Semiconductor strain gauges, cantilevers and membranes have been developed as force sensors directly integrated with the LCD display during semiconductor manufacturing, but these require special designs and can be relatively expensive. Piezoresistive sensors have improved tolerances to manufacturing stresses and are capable of useful functioning when incorporated as edge or corner sensors within the touch system but this may require redesign from material selections to assembly process to ensure optimal integration of force sensors. For larger touch systems, even the edge/corner piezoresistive sensors face challenges with spatial resolution and mechanical robustness. Hence, there is a need for sensitive and robust force sensing touch system that is low cost and capable of modular integration into existing designs.

TECHNICAL PROBLEM

The force sensing touch structure of this invention includes a touch system; a supporting plate with strain amplifying structure; a supporting plate attached to the overlying touch system using adhesive applied solely over the strain amplifying structure; a force sensing layer; and a force sensing layer attached to the supporting plate using adhesive.

Solution to Problem

Technical Solution

According to one aspect of this invention, a force sensing touch screen detects user touch and communicates with a control unit of the computing device to take action. The force sensing touch screen includes a touch sensing panel, a display, and a strain amplifying force sensing structure; and the force sensing touch screen in communication with the control unit determines user touch position and how hard the user pushed on the touch screen. The control unit and its programming further determine actions based on how hard the user pushed at that location.

Another aspect of this invention is a force sensing touch pad that detects user touch and communicates with a control unit of a computing device to take action based on force applied by the user. The force sensing touch pad includes a touch sensing panel and a strain amplifying force sensing structure attached to the underside of the touch sensing panel. The signal from the touch sensing panel determines the x-y position of user touch and the signal from the strain amplifying force sensing structure determines the user force or the x-y position and force of user touch are solely determined from a signal from the strain amplifying force sensing structure. The position and force signal correspond to a specific location on an associated but separate display and the control unit with its programming determines the necessary actions for the computing device.

In yet another aspect of this invention, a force sensing touch control detects if the user is applying gentle pressure or moderate pressure or hard pressure at the touch button and the computing device only takes action when pressure in a given range value is detected. The force sensing touch control includes a metal or glass or plastic plate and a touch sensing panel with a strain amplifying force sensing structure and may or may not include a capacitive or resistive touch. The metal or glass or plastic plate includes art work that identifies places where the user may touch to initiate actions. The force sensing touch system communicates user touch to the control unit and the control unit programming determines the level of user pressure and takes action corresponding to the level of pressure within the computing device.

ADVANTAGEOUS EFFECTS OF INVENTION

Advantageous Effects

Within this invention terms such as applied force or pressure or how hard a user pushes and such should all be viewed as the same and suggest a measure of touch detected by force sensors. Also use of terms such as light touch versus hard touch or moderate push versus hard push or low force versus medium force or low-, medium-, high-pressure all should be viewed the same and refer to signals detected by the force sensor that are within some range in values and these range of values are differentiable from each other.

BRIEF DESCRIPTION OF DRAWINGS

Description of Drawings

Figure 1:
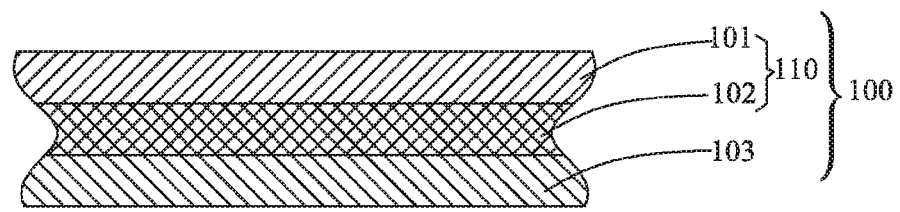
Figure 2:
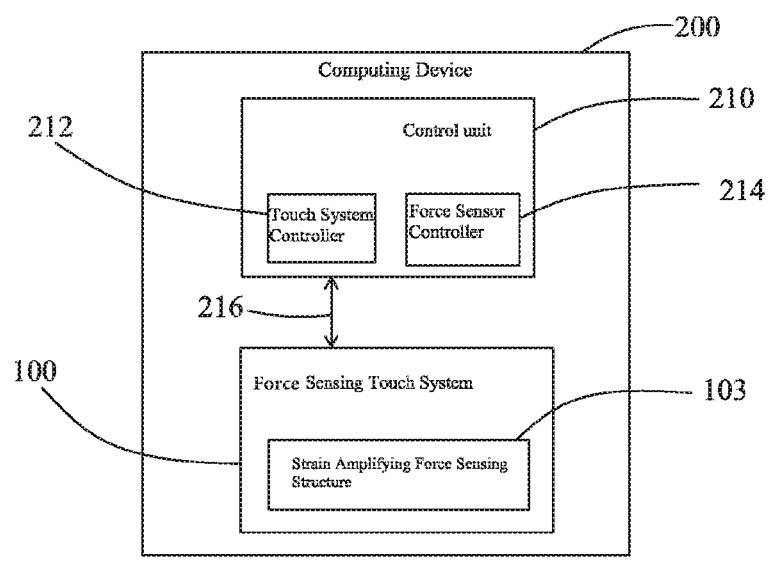
Figures 3A, 3B:
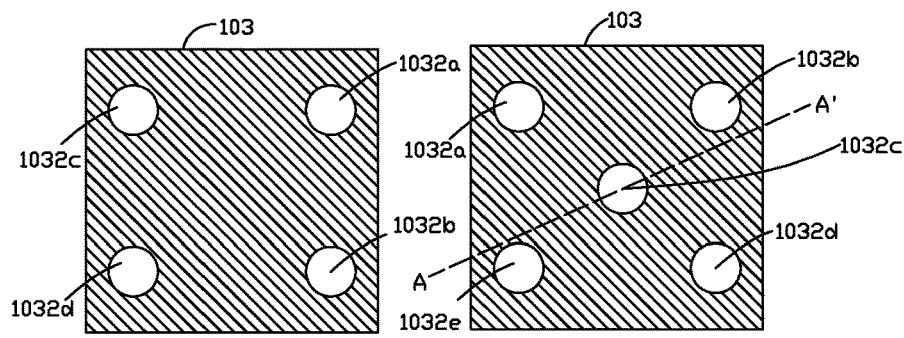
Figure 4A:
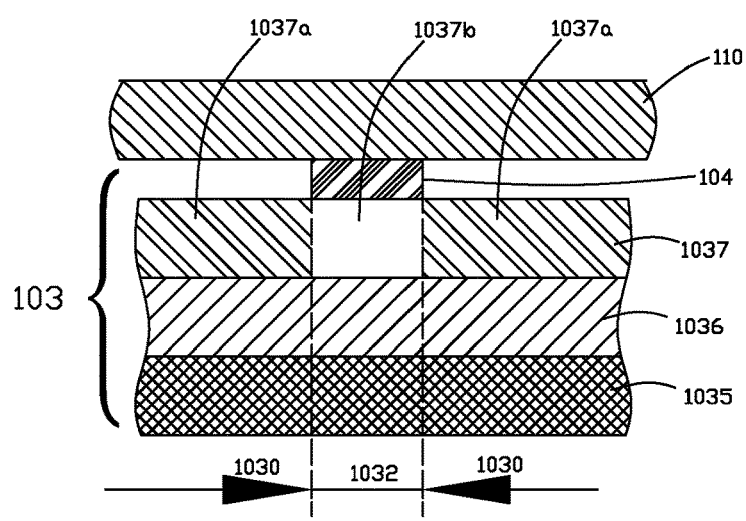
Figure 4B:
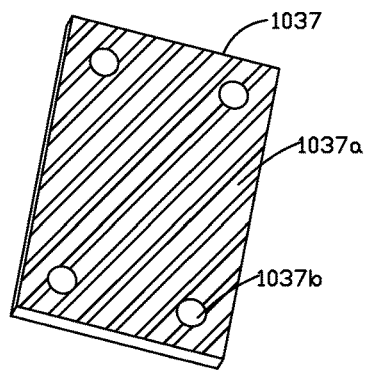
Figure 4C:
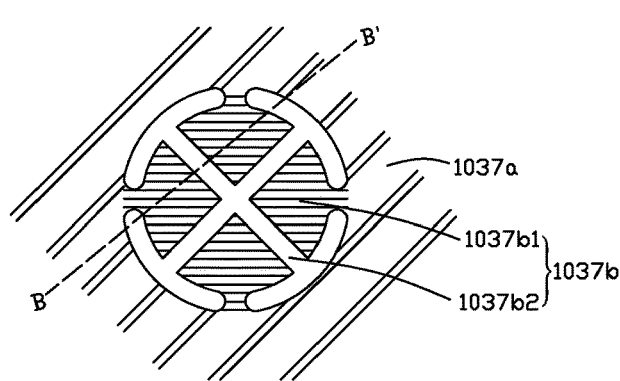
Figure 4D:
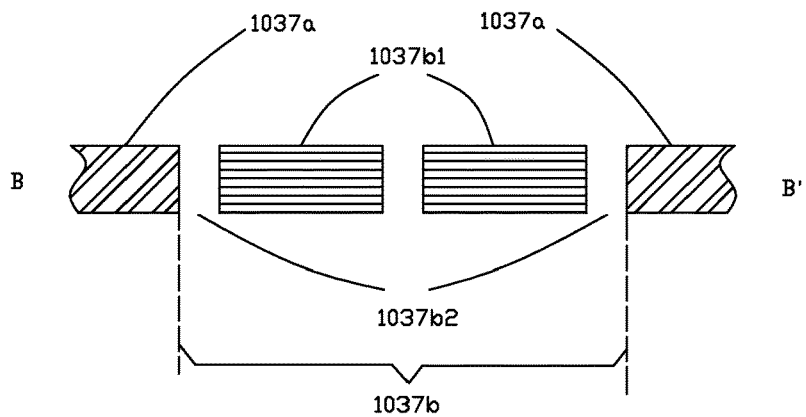
Figure 5:
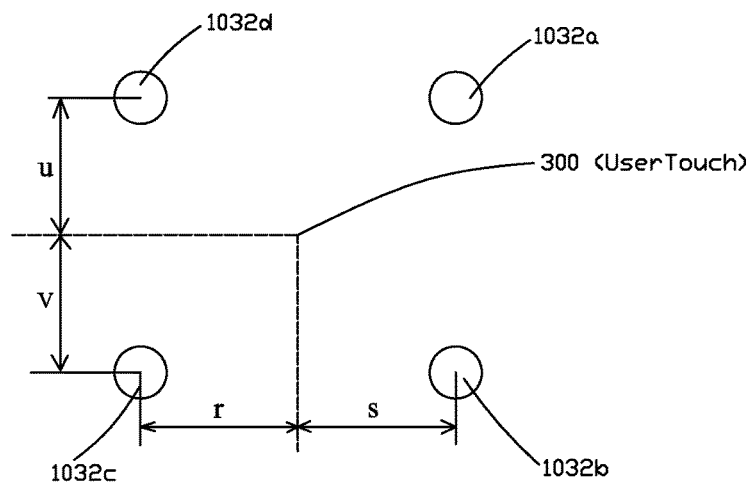

FIG. 1 is a schematic cross section of a force sensing touch screen or system in accordance with the present invention;

FIG. 2 is a simplified block diagram of a computing device;

FIG. 3A~FIG. 3D are respectively a plan view of four embodiments of a strain amplifying force sensing structure;

FIG. 4A is a simplified cross section (across A-A' in FIG. 3B) of the strain amplifying force sensing structure and its modular attachment to the touch system;

FIG. 4B is a perspective view of the supporting plate;

FIG. 4C shows details of another embodiment of the supporting plate;

FIG. 4D is a simplified cross section (across B-B' in FIG. 4C) of the supporting plate; and FIG. 5 shows an example for calculating touch position and force in a four (4) force sensing touch system.

MODE FOR THE INVENTION

Mode for Invention

To make the objectives, technical solutions and advantages of the present invention clearer, the present invention will be further described hereinafter with reference to the accompany drawings and embodiments. It shall be understood that, the embodiments described herein are only intended to illustrate but not to limit the present invention.

Computing devices with a force sensing touch system are common place for many applications. The structure, assembly and manufacturing of computing devices with force sensing touch systems is a highly optimized process that takes significant effort to develop, setup and mature. This process is developed to ensure the manufacturer not only provides a good product but also does so in a profitable manner. As computing devices with touch systems continue to progress, it is desirable to have force sensing touch systems. It is also desirable to have force sensing touch systems that are easily introduced into existing manufacturing processes, and have force sensors that are highly sensitive and reliable. Force sensors that can be added to the undersurface of existing touch systems are most easily introduced into existing manufacturing processes. Attaching force sensors at the undersurface requires the force sensors to be very sensitive and have the capability to react to very small strain deflection in the overlying touch system. A strain amplifying force sensing structure of this invention is suitable for developing optimal and reliable force sensing touch systems.

FIG. 1 is a schematic cross section of a force sensing touch system 100 that has a strain amplifying force sensing structure 103 attached to the touch system 110 that includes a touch sensing panel 101 and a display 102. The force sensing touch system 100 shown in FIG. 1 is a force sensing touch screen, but it may also be a touch pad or touch control or combinations thereof where part or all of the touch sensing panel 101 may or may not be transparent and the display 102 may or may not be present. The touch sensing panel 101 may be covered by a protective sheet of glass or plastic (not shown) and may have support structures (not shown). The strain amplifying force sensing structure 103 is attached using an adhesive to an underside of the touch system 110. The strain amplifying force sensing structure 103 may cover the entire underside of the touch system 110 or may cover a part of the underside of the touch system 110. The strain amplifying force sensing structure 103 may be a continuous single structure on the underside of the touch system 110 or may be many structures each operating independently of the other structures or all structures operating in unison and on the underside of the touch system 110.

For attachment between the touch system 110 and the strain amplifying force sensing structure 103, a sort of adhesive may be continuous or the adhesive may be applied only to select areas.

FIG. 2 is a simplified block diagram of the computing device 200 showing a control unit 210, and a force sensing touch system 100. The force sensing touch system 100 connects to the control unit 210 through an electrical signal transmitting setup 216. The force sensing touch system 100 includes the strain amplifying force sensing structure 103. Specifically, the force sensing touch system 100 may have a single electrical connection 216 to the control unit 210 or may have many electrical connectors to the control unit 210. More specifically, the strain amplifying force sensing structure 103 may connect to the control unit 210 through its own independent electrical transmitting setup (not shown). A common electrical connector may be a flexible printed circuit, one or more, that sends signals, one or more, between the force sensing touch system 100 and the control unit 210. The computing device 200 may have other features not shown in FIG. 2 such as motion sensors, a power button, an antenna, speakers, microphones, keypads, light indicators and so on. The control unit 210 may include a touch system controller 212 and a force sensor controller 214 therein. The control unit 210 may also include, although not shown, a processor, a display controller, a memory, a firmware and other software, an input-output interface and so on. The firmware and any software within the control unit 210 are referred to as its programming. Even though in FIG. 2 the control unit 210 is shown as a single block, in practice the various components of the control unit 210 may be distributed. Specifically, the force sensor controller 214 may be a separate unit. The force sensing touch system 100 may further include a touch sensing panel and a display. The touch sensing panel may be capacitive or resistive touch or such. The display may be an LCD or OLED display. All of these are described for purposes of explanation only. Those well versed in the art of computing devices know the possible variations and details necessary beyond what is described here. For purposes of the present invention it should be stated that the descriptions of these figures should not be limiting. When a user pushes on the force sensing touch system 100, for example, the touch screen, the touch sensing panel will send a signal to the control unit 210. The control unit 210 along with its programming will process the signal and identify the position of the user touch. Also, when the user pushes on the force sensing touch system 100, the force sensing touch system 100 will undergo some deflection and this deflection will be detected by the strain amplifying force sensing structure 103 that will send a signal to the control unit 210. The control unit 210 along with its programming may determine position and how hard the user has pushed on the force sensing touch system 100. The available information about the position of touch and how hard the user touched the touch screen is combined together and called a touch input. The touch input is used by the control unit 210 and its programming to takes necessary action called a touch output. U.S. Pat. Nos. 4,550,384, 7,196,694 B2, 7,746,352 B2, US Patent Publication 2007/0052690 A1 describe methods to determine the x-y position of force sensing touch using moment and vector based calculations. The applied force in a calibrated force sensing touch system is distributed across all the force sensors and can be calculated to get the user touch force. To those well versed in the art of force sensing touch systems it is well known how to calibrate force sensors and use the control unit 210 and its programming to calculate user touch position and force.

Figures 3C, 3D:
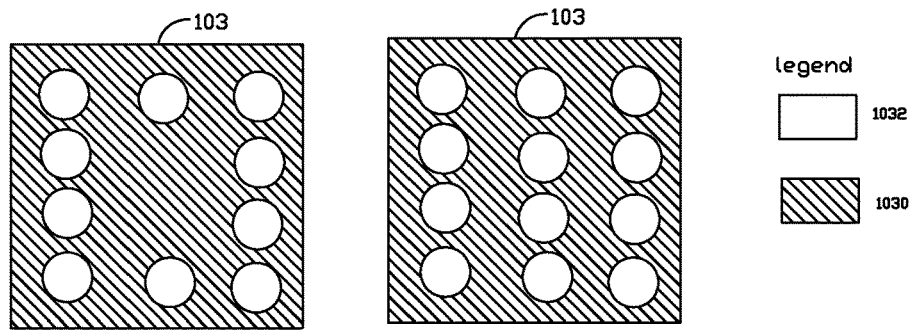

FIG. 3A to FIG. 3D are respectively a plan view of four embodiments of the strain amplifying force sensing structure 103. The strain amplifying structure 103 is designed to provide optimal operation of the included force sensors. The strain amplifying force sensing structure 103 includes a first region (a strain amplifying region) 1032 and a second region 1030. The first region 1032 is a force sensing region. The second region 1030 is not a force sensing region. The force sensors of the first region 1032 are labeled as 1032a, 1032b, 1032c, 1032d, 1032e and so on and may be distributed at different locations within the strain amplifying force sensing structure 103. The force sensor such as 1032a of the first region 1032 includes a strain amplifying structure and associated force sensor and the second region 1030 does not include a strain amplifying structure. The force sensors such as 1032a may be placed anywhere within the strain amplifying force sensing structure 103, for example in four corners (as shown in FIG. 3A); in four corners and center (as shown in FIG. 3B); as a border (as shown in FIG. 3C); or as an array (as shown in FIG. 3D). The strain amplifying region 1032 is specially designed to take small deflections in the overlying touch system and to amplify its strain. The amplified strain is imparted to the underlying force sensor. The force sensor then has an improved response due to the strain amplifying region. FIG. 4A is a simplified cross section (across A-A' in FIG. 3B) of the strain amplifying force sensing structure 103 and its modular attachment to the touch system 110. The strain amplifying force sensing structure 103 includes a force sensor layer 1035 attached with an adhesive 1036 to the supporting plate 1037 that is then attached with an adhesive 104 to the underside of the touch system 110. The force sensor layer 1035 may include one or more force sensors. The strain amplifying force sensing structure 103 connects to the control panel of the control unit through an electrical signal transmitting setup that is not shown. The force sensor layer 1035 may be a screen printed multilayer stack that includes a substrate, active force sensing material, insulating layers, layer with conductive metal traces, passivation layer and so on. The conductive traces may include a power and ground traces and electrical signal traces for measurement and reference sensor outputs. The printed force sensor layer uses a glass or flexible plastic or polyimide substrate. The thickness of the force sensor layer 1035 can be between 25 to 350 microns, specifically between 50 to 200 microns. The force sensing material changes its intrinsic material property with applied force allowing the force sensing layer to output an electrical signal that changes as a user changes the applied force. The force sensing material may be a structural composite that may be based in polymer or ceramic or semiconducting material and may contain one or more metallic particle or one or more insulating particle or a combination thereof along with other fillers. The adhesives 1036, 104 used within the strain amplifying force sensing structure 103 not only provide excellent adhesion but are robust to mechanical movements and remain reliable over time. Further, the adhesives ensure that the touch system deflections initiated by user touch are optimally transmitted with minimum loss within the adhesives. Adhesives may be epoxy resins, commercial glues, two sided tapes and so on. The supporting plate 1037 as shown in FIG. 4B may be plastic or metal or glass and typically less than 3 mm in thickness and select parts of the plate are patterned with openings that may extend the entire thickness of the plate. It is possible to use a greater thickness of support plate 1037 but this is usually not necessary. Within the strain amplifying force sensing structure 103, the supporting plate 1037 may include a plurality of patterned regions 1037b which are patterned and amplify strain, and the other unpatterned region 1037a which is not patterned and does not amplify strain. The patterned region 1037b of the supporting plate 1037 overlays the active sensor areas and adhesive 104 may be only applied over patterned regions 1037b of the supporting plate 1037 or may be applied over both the unpatterned region 1037a and patterned region 1037b of the supporting plate 1037. Projection of the strain amplifying regions 1037b and associated force sensors is labeled 1032 and in a region where there is no strain amplification is labeled 1030 at the bottom of FIG. 4A. When two force sensors are paired together in close proximity and one force sensor is centrally located under the patterned region 1037b and the second force sensor is also placed in the patterned region 1037b but near its edge, the force sensing operates more reliably against external temperature variation because paired sensors experience similar temperature driven material property changes and therefore compensate for this change; any signal from the sensor pair is then mainly due to user applied touch and associated force.

FIG. 4C and FIG. 4D show details of the supporting plate 1037 with a patterned region 1037b being patterned for strain amplification and an unpatterned region 1037a that is not patterned and does not amplify strain. The patterned region 1037b consists of a shaped opening 1037b2 that extends through the entire thickness of the supporting plate 1037 and an unpatterned inner region 1037b1 that is not patterned. The unpatterned inner region 1037b1 and unpatterned region 1037a must always be fully connected to ensure a mechanically stable patterned structure 1037b. The overall shape of the patterned structure 1037b can be circular or square or any geometrical shape with openings that extend through the entire thickness of supporting plate 1037. The supporting plate 1037 is attached to the overlying touch system with an adhesive 104 such as an epoxy or glue or double side tape or such, and preferably attached using double sided tape. The adhesive 104 may only be applied over the patterned region 1037b or may be applied to both the patterned region 1037b and the unpatterned region 1037a, preferable applied only over region 1037b.

FIG. 5 shows an example for calculating touch position and force in a four (4) force sensing touch system. The four force sensors are labeled 1032a, 1032b, 1032c, and 1032d. The x-distance between sensors 1032b and 1032c is (r+s). The y-distance between sensors 1032c and 1032d is (u+v). Let us assume the user touches at 300 and applies a force of F grams. Let the computing device measure the force calculated at force sensors 1032a as Fa; at 1032b as Fb; at 1032c as Fc; at 1032d as Fd. Then the total force F is calculated from the equation F=Fa+Fb+Fc+Fd. Using the sensor 1032c as the origin for x-y coordinates, the touch x-position is calculated as x=r=(r+s)(Fb/[Fc+Fb]) and the y-touch position is calculated as y=v=(u+v)(Fd/[Fc+Fd]). FIG. 5 calculations assume that the adhesive 104 is only applied over the patterned regions 1037b of the supporting plate 1037 and the attached touch system is in contact with the underlying strain amplifying force sensing structure; the user applied force being transmitted through region labeled 1032 in FIG. 4A and in this situation the applied force in a force sensing touch system is distributed only across the force sensors and can be summed up to get the user touch force.

According to one aspect of this invention, a force sensing touch system 100 detects user touch and communicates with control unit 210 of the computing device 200 to take action. The force sensing touch screen includes a touch sensing panel 101, a display 102, and a strain amplifying force sensing structure 103; the force sensing touch screen is in communication with control unit to detect user touch position and how hard the user pushed on the touch screen. The strain amplifying force sensing structure has four (4) force sensors such as 1032a, 1032b, 1032c, 1032d at corners of the touch screen. The strain amplifying force sensing structure may have fewer, but at least three (3), or a larger number of force sensors and these may be placed in any geometrical arrangement. The control unit and its programming further determine actions based on position and how hard the user pushed at that location. Within the scope of this invention, the user touch position may be determined not only by the touch sensing panel but may also be determined by the strain amplifying force sensing structure. The control unit and its programming may use the position information from touch sensing panel or strain amplifying force sensing structure or a combination of both. The strain amplifying force sensing structure signal that is communicated to the control unit may solely be used to determine the user touch position and how hard the user pushed. As an example, the user is viewing a document on a touch screen and the user pushes hard with a bare finger at a specific word within this document. The user touch is detected by the touch sensing panel and the user force is recognized by the strain amplifying force sensing structure. The electrical signal from the touch sensing panel is communicated to the control unit and the user touch position is recorded and correlated to the content within the document by the control unit's programming. A second electrical signal from the strain amplifying force sensing structure is communicated to the control unit and the programming determines that how hard the user touched the screen by adding the force calculated at the four force sensors; if the user push was beyond the programmed force threshold, the control unit takes action to show the meaning of the word on the display. At another time the user pushed with a gloved finger at a word in the document being read on the touch screen and this user touch is only detected by the strain amplifying force sensing structure. The touch sensing panel that is capacitive touch may not reliably detect a glove finger touch. In this situation only the signal from the force sensors is communicated to the control unit and both the user touch position and applied force is determined solely based on force sensing signal information. The control unit takes action based on its programming and in this case, based on the applied force, takes the user to a correlated location within the document to find a next occurrence of the selected word. The control panel and its programming is set u to recognize two ranges of force, at one range of force the meaning of the word is shown and at the second range of force the next occurrence of the word is activated and in both cases the user touch position is used to identify and select the correct word within the document.

Another aspect of this invention is a force sensing touch pad that detects user touch and communicates with a control unit of a computing device to take action based on how hard the user has pushed based. FIG. 1 may be used to explain a force sensing touch pad. The force sensing touch pad includes a touch sensing panel 101 and a strain amplifying force sensing structure 103 attached to the underside of the touch sensing panel. The touch pad does not contain a display 102. The signal from the touch sensing panel determines the x-y position of user touch and the signal from the strain amplifying force sensing structure determines how hard the user pushed or in another situation the x-y position and force of user touch are solely determined from a signal from strain amplifying force sensing structure. The position and force signal corresponds to a specific location of an associated display and the control unit with its programming determines the necessary actions for the computing device. As an example, the user is looking at a map on a display of a laptop that has a force sensing touch pad. Two fingers touch the force sensing touch pad and with a hard sliding action the fingers are moved away from each other. The touch sensing panel detects the touch from two fingers and their movement and the electrical signal is communicated to the control unit. The control unit and its associated programming determine the gesture as a zoom-in. The strain amplifying force sensing structure detects the position and how hard the two fingers are pushing and the electrical signal is communicated to the control unit. The control unit and its associated programming determine the user touch position within the displayed map based on combined information from the touch panel and the force sensors and determines solely from the force sensors that the two fingers are pushing harder than the threshold force. The control unit and its programming combine the information of high force and zoom-in gesture and takes action of 5× zoom-in of the map region touched and gestured by the user. All of the details discussed for touch screen and in FIG. 1 through FIG. 5 are equally applicable to force sensing touch pads with necessary modifications as is well understood by those well versed in the art of computing devices and touch systems.

In yet another aspect of this invention, a force sensing touch control detects if the user is applying gentle pressure or moderate pressure or hard pressure at the touch button and the computing device only takes action when pressure in a specific range value is detected. The force sensing touch control includes an exterior panel that may be a painted glass or plastic or metal plate that overlies the touch sensing panel with strain amplifying force sensing structure attached to its underside; the touch sensing panel may or may not include a capacitive or resistive touch. The force sensing touch control may or may not have a display under the touch sensing panel. In another embodiment both the touch panel and the display may not be present and a metal plate directly overlies the strain amplifying force sensing structure. The metal plate includes art work that identifies places where the user may touch to initiate actions. The metal plate may also be a plastic or glass plate. The force sensing touch control communicates user touch to the control unit and the control unit programming determines if the user has pushed hard enough to warrant taking an action within the computing device. All of the details discussed for a touch screen or touch pad and in FIG. 1 through FIG. 5 are equally applicable to force sensing touch controls with necessary modification as is well understood by those well versed in the art of computing devices and touch systems. As an example, the force sensing touch control has discrete keys arranged as a keypad and at least ten (10) numeric keys are identified by numeric zero (0) to nine (9). Each key is identified by its preset position and communicates with the control unit as such. Further all keys can be pushed by the user with a light or heavy push and this signal is sent by the strain amplifying force sensing structure to the control unit. The control unit and its programming determines if the signal is a low push versus a heavy push and takes action based on the numeric key pushed as well as how hard the key was pushed. A force control keypad may be used for security applications and more specifically as a password entry device. One advantage of a force control keypad device in security applications may be to make it difficult to record the user entered password. Video recorders may record the keystrokes applied by the user when entering a password but since they cannot discern the amount of applied force the exact password is therefore not disclosed to the recording device.

The forgoing descriptions and discussions and examples disclosed in this invention are meant only to be exemplary and are not meant to be limiting. Those well versed in the art of computing devices, touch systems, and force sensors well understand that the concepts disclosed herein are extendable well beyond the embodiments discussed.

The invention claimed is:

1. A computing device for detecting a touched position and a touching force, comprising:
a touch system; and
a strain amplifying and force sensing structure attached to a surface of the touch system;
wherein the strain amplifying and force sensing structure comprises a force sensing layer and a support plate comprising a strain amplifying structure including a patterned strain amplifying region, the force sensing layer measuring the touching force at the patterned strain amplifying region,
wherein the support plate further comprises a non-patterned region that does not amplify the touching force, and the patterned strain amplifying region has an opening extending through the support plate in a direction substantially perpendicular to the support plate.

2. The computing device of claim 1, further comprising: a controller configured to communicate with the touch system and the strain amplifying and force sensing structure.

3. The computing device of claim 2, wherein the controller is configured to perform an action based on the touched position and/or the touching force, the touched position and the touching force being determined based on a signal from one or more force sensors included in the force sensing layer.

4. The computing device of claim 1, wherein the touch system comprises at least one of a touch screen, a touch pad and a touch control.

5. The computing device of claim 1, wherein the touch system comprises at least a touch sensing panel and at least one of a display, a substrate, a protective cover, a support frame, and a printed circuit board.

6. The computing device of claim 1, wherein the strain amplifying and force sensing structure comprises plural force sensors in close proximity, one of the plural force sensors being aligned with the patterned strain amplifying region of the support plate and another one of the plural force sensors being aligned with another region of the support plate in proximity to an edge of the patterned strain amplifying region.

7. The computing device of claim 1, wherein the support plate is adhered to the surface of the touch system and the force sensing layer is adhered to the support plate.

8. The computing device of claim 1, wherein the support plate is attached to the touch system by applying an adhesive only over the strain amplifying structure and the force sensing layer is adhered to the support plate.

9. The computing device of claim 1, wherein the force sensing layer is printed on a substrate and includes at least one of an active force sensing material, an insulating layer, a layer with conductive metal traces, and a passivation layer.

10. The computing device of claim 1, wherein the force sensing layer includes at least one force sensor.

11. The computing device of claim 1, wherein the strain amplifying structure is structured to take small deflections in the touch system and to amplify a strain, the amplified strain being imparted to the force sensing layer.

12. The computing device of claim 1, wherein the force sensing layer comprises plural force sensors in close proximity, one of the plural force sensors being aligned with a central part of the patterned strain amplifying region of the support plate, and another one of the plural force sensors being aligned with a region of the support plate in proximity to an edge of the patterned strain amplifying region.

13. A method for performing an action based on a touched position and/or an amount of touching force, the method comprising:

amplifying a strain applied to a strain amplifying and force sensing structure on a support plate, the strain amplifying and force sensing structure including a patterned strain amplifying region, a non-patterned region that does not amplify the strain, and a force sensing layer, wherein the patterned strain amplifying region has an opening extending through the support plate in a direction substantially perpendicular to the support plate, the force sensing layer measuring amplified strain at the patterned strain amplifying region and producing a signal, determining the touched position based on the signal from the force sensing layer, determining the amount of touching force based on the signal from the force sensing layer, and performing the action based on the determined touched position and/or the determined amount of touching force.

14. A force sensing touch system comprising:

a touch system, a supporting plate comprising a strain amplifying structure including a patterned strain amplifying region, the supporting plate being attached to a surface of the touch system using a first adhesive layer, and a force sensing layer attached to the supporting plate and aligned with the patterned strain amplifying region using a second adhesive layer, the force sensing layer measuring a force amplified by the patterned strain amplifying region of the strain amplifying structure, wherein the supporting plate with the strain amplifying structure further comprises a non-patterned region that does not amplify the force, the patterned strain amplifying region defining an opening that extends through the supporting plate in a direction that is substantially perpendicular to the supporting plate, the force sensing layer being disposed across the opening.

15. The force sensing touch system of claim 14, wherein the force sensing layer is printed on a substrate and includes an active force sensing material, an insulating layer, a layer with conductive metal traces, and/or a passivation layer.

16. The force sensing touch system of claim 14, wherein the supporting plate is attached to the surface of the touch system by applying the first adhesive layer solely over the strain amplifying structure on the supporting plate.

17. The force sensing touch system of claim 14, wherein the first adhesive layer that attaches the supporting plate to the touch system comprises a double sided tape, and the second adhesive layer that attaches the force sensing layer to the supporting plate comprises epoxy.

18. The force sensing touch system of claim 14, wherein the touch system comprises at least one of a touch screen, a touch pad, and a touch control.

19. The force sensing touch system of claim 14, wherein the force sensing layer comprises at least one force sensor.

* * * * *